United States Patent
Takamori et al.

(10) Patent No.: US 10,837,862 B2
(45) Date of Patent: Nov. 17, 2020

(54) SOUNDNESS DETERMINATION DEVICE, SOUNDNESS DETERMINATION METHOD, AND SOUNDNESS DETERMINATION PROGRAM

(71) Applicant: FUJIFILM Corporation, Tokyo (JP)

(72) Inventors: Tetsuya Takamori, Tokyo (JP); Satoshi Kubota, Tokyo (JP); Masayuki Negoro, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 293 days.

(21) Appl. No.: 15/899,404

(22) Filed: Feb. 20, 2018

(65) Prior Publication Data

US 2018/0180511 A1 Jun. 28, 2018

Related U.S. Application Data

(63) Continuation of application No. PCT/JP2016/074007, filed on Aug. 17, 2016.

(30) Foreign Application Priority Data

Sep. 10, 2015 (JP) ................... 2015-178453

(51) Int. Cl.
*G01B 3/44* (2006.01)
*G01M 5/00* (2006.01)
(Continued)

(52) U.S. Cl.
CPC .......... *G01M 5/0033* (2013.01); *G06Q 50/08* (2013.01); *G06Q 50/10* (2013.01)

(58) Field of Classification Search
CPC .................................. G01M 5/0033
(Continued)

(56) References Cited

U.S. PATENT DOCUMENTS 9,162,762 B1 * 10/2015 Tofte ............... B64C 39/024
9,443,159 B2 * 9/2016 Yumbe ............ G06K 9/0063
(Continued)

FOREIGN PATENT DOCUMENTS

JP 2002-174601 A 6/2002
JP 2005-190271 A 7/2005
(Continued)

OTHER PUBLICATIONS

The extended European search report issued by the European Patent Office dated May 4, 2018, which corresponds to European Patent Application No. 16844138.4-1222 and is related to U.S. Appl. No. 15/899,404.

(Continued)

*Primary Examiner* — Aditya S Bhat
(74) *Attorney, Agent, or Firm* — Studebaker & Brackett PC

(57) ABSTRACT

A search unit acquires a type of damage and a degree of damage for each member position obtained in a damage information extraction process of a damage information extraction device. The search unit collates building structure information of a building structure information DB, the degree of damage corresponding to the type of damage for each member position analyzed by an inspection data analysis unit, and use environment history information of a use environment history information DB with soundness information of a soundness DB and searches for soundness of a building similar thereto. A soundness determination unit determines soundness of a building that is an inspection target on the basis of the soundness of the building that has been searched for. A soundness output unit outputs the soundness to a display, a printer, or the like.

13 Claims, 7 Drawing Sheets

(51) Int. Cl.
*G06Q 50/08* (2012.01)
*G06Q 50/10* (2012.01)

(58) Field of Classification Search
USPC .......................................................... 702/34
See application file for complete search history.

(56) References Cited

U.S. PATENT DOCUMENTS

| | | | |
|---|---|---|---|
| 2007/0225863 A1 | 9/2007 | Gross et al. | |
| 2007/0288269 A1 | 12/2007 | McLemore et al. | |
| 2014/0100889 A1* | 4/2014 | Tofte .................. | G06K 9/00791 705/4 |

FOREIGN PATENT DOCUMENTS

| | | | |
|---|---|---|---|
| JP | 2006-107234 A | 4/2006 | |
| JP | 3975406 B2 | 9/2007 | |
| JP | 4279159 B2 | 6/2009 | |
| JP | 2010-133835 A | 6/2010 | |
| JP | 2015-095143 A | 5/2015 | |
| JP | 2015-151657 A | 9/2015 | |

OTHER PUBLICATIONS

An Office Action; "Notification of Reasons for Refusal," issued by the Japanese Patent Office dated Oct. 15, 2018, which corresponds to Japanese Patent Application No. 2017-539089 and is related to U.S. Appl. No. 15/899,404; with English language translation.
Yu Otake et al.; Statistical study on evaluating bridge health degree based on bridge inspection database; Journal of Applied Mechanics vol. 14, Journal of Japan Society of Civil Engineers, Ser. A2 (Applied Mechanics) vol. 67, Issue 2; 2011; pp. I_813-I_824; Japan.
International Search Report issued in PCT/JP2016/074007; dated Nov. 1, 2016.
Written Opinion issued in PCT/JP2016/074007; dated Nov. 1, 2016.
International Preliminary Report on Patentability; issued in PCT/JP2016/074007; dated Mar. 13, 2018.
Communication pursuant to Article 94(3) EPC issued by the European Patent Office dated May 29, 2020, which corresponds to European Patent Application No. 16 844 138.4-1222 and is related to U.S. Appl. No. 15/899,404.

* cited by examiner

FIG. 2

| NAME | DATE OF COMPLETION | DATE OF START OF SERVICE | ACCIDENT | MAINTENANCE PLACE AND DATE | ⋮ | ⋮ |
|---|---|---|---|---|---|---|
| O×BRIDGE | ○MONTH △△DAY ××YEAR | □MONTH △×DAY ○○YEAR | ×MONTH O×DAY O□YEAR FLOOD | △△MONTH ×○DAY □□YEAR MAIN GIRDER STEEL PORTION COATING | | |

| NAME | STRUCTURE | IMAGE DATA | MEMBER | | | |
|---|---|---|---|---|---|---|
| | | | UPPER STRUCTURE | LOWER STRUCTURE | SUPPORT | OTHERS |
| O×BRIDGE | 2 SPAN CONTINUOUS STEEL FLOOR BOX GIRDER BRIDGE | XXXX.jpg | MAIN GIRDER: STEEL TRANSVERSE GIRDER: STEEL SLAB: PC | ABUTMENT: RC PIER: RC | RUBBER | BRIDGE FALL PREVENTION APPARATUS: CABLE |

POSITION INFORMATION
X= ·····
Y= ·····
Z= ·····

POSITION INFORMATION
X= ·····
Y= ·····
Z= ·····

POSITION INFORMATION
X= ·····
Y= ·····
Z= ·····

SOUNDNESS DETERMINATION DEVICE, SOUNDNESS DETERMINATION METHOD, AND SOUNDNESS DETERMINATION PROGRAM

CROSS-REFERENCE TO RELATED APPLICATIONS

This application is a Continuation of PCT International Application No. PCT/JP2016/074007 filed on Aug. 17, 2016, which claims priority under 35 U.S.C. § 119(a) to Japanese Patent Application No. 2015-178453 filed on Sep. 10, 2015. Each of the above application(s) is hereby expressly incorporated by reference, in its entirety, into the present application.

BACKGROUND OF THE INVENTION

1. Field of the Invention

The present invention relates to a soundness determination device, a soundness determination method, and a non-transitory computer readable recording medium storing a soundness determination program, and more particularly, to a soundness determination device, a soundness determination method, and a non-transitory computer readable recording medium storing a soundness determination program for diagnosing soundness of a building.

2. Description of the Related Art

Determining soundness of buildings such as bridges, tunnels, or buildings from results of inspection of the buildings is performed in the related art. The inspection is performed as observation of a deformation phenomenon such as cracks, and causes of the deformation are specified on the basis of information on the inspection, a surrounding environment, design information of the building, or the like, and the determination of the soundness is performed.

In order to accurately perform the determination of the soundness, advanced and extensive expertise and long analysis time are required. Therefore, a system for supporting the determination of the soundness has been considered.

JP3975406B describes calculating a degree of repair construction requirement from a damage situation of each building using achievement data of previous repair constructions and unexecuted constructions as a teaching value, and calculating a distance from a discrimination boundary between repair construction requirement/non-requirement to a coordinate point of a damage situation in two-dimensional coordinates.

JP4279159B describes a system for estimating causes of a deformation on the basis of deformation information, structure information, and information on surroundings of a building and determining soundness. That is, a crack caused by external force among cracks in tunnel lining is automatically picked up from a deformation development view, and collated with 50 or more types of crack deformation patterns in advance to check which of the crack deformation patterns the crack corresponds to, and an external force acting on the tunnel is estimated on the basis of the corresponding crack deformation pattern and basic information such as a ground condition of surroundings, a geological condition, a construction condition at the time of construction, and a structure condition. Further, dynamical soundness of the tunnel is determined on the basis of information on the basic information together with the estimated causes of the deformation.

In Basic Study on Evaluation of Soundness of Bridges on the basis of Bridge Inspection Database Using Statistical Scheme, Proceedings of Civil Engineering Association A2 (Applied Mechanics), Vol. 67, No. 2 (Applied Mechanics Papers Vol. 14), I_813-I_824, 2011, a contribution rate (weight) to the soundness of each component is calculated by performing main component analysis on an evaluation result of each inspection item, and the soundness of the component is evaluated using one or two indicators from a large number of inspection items.

SUMMARY OF THE INVENTION

In recent years, aging of social infrastructures has become a problem. At the time of maintenance of an aged social infrastructure, it is preferable for an inspector with expertise to inspect each place of the infrastructure in detail. However, there are restrictions caused by a budget, personnel, and a place or the number of installed infrastructures, and it is difficult to instantaneously inspect all infrastructures. Therefore, a mechanism for easily and rapidly performing inspection with a focused main point for distinguish between serious damage requiring urgent measures and non-serious damage is required.

In JP3975406B, the degree of repair construction requirement is calculated only from the damage situation of the building, and how much the damage affects the soundness of the entire building in relation to a structural position is not analyzed. Therefore, the degree of the repair construction requirement is likely to be determined to be low despite the fact that a place having a great influence on safety of the building in a structure thereof is damaged.

In JP4279159B, a determination of the soundness is performed from information on a deformation or damage of the entire building regardless of a difference in an influence of the deformation or the damage of the building on a strength or the soundness of the building according to a part of occurrence or a type of damage. Therefore, in order to determine the soundness of the building, it is necessary to perform inspection of the entire building, which requires a large effort. Further, in JP4279159B, since the influence according to the part or the type of damage is not evaluated, an accurate determination cannot be performed in some cases. Further, JP4279159B does not specifically describe how to estimate causes of the deformation from basic information of the tunnel. Therefore, a determination of mechanical soundness depends on the estimation of the causes of the deformation considering the basic information of the tunnel by a technician with expertise. Therefore, each technician must estimate the causes of the deformation for each tunnel that is an inspection target, and it is difficult to secure the technician.

The present invention has been made in view of the above circumstances, and an object of the present invention is to provide a soundness determination device, a soundness determination method, and a non-transitory computer readable recording medium storing a soundness determination program that enable rapid and efficient soundness determination to be performed in consideration of structure information of a building on the basis of soundness determined for other buildings.

In order to solve the above problems, a first aspect of the present invention provides a soundness determination device comprising: a damage information input unit that receives an input of first damage information on damage of a surface of an arbitrary first building that is a soundness determination target; a structure information input unit that receives an input of first structure information on a structure of the first building; a storage unit that stores, for one or more second buildings different from the first building, soundness information in which second damage information on the damage of a surface of the second building, second structure information on a structure of the second building, and soundness of the second building are associated with one another; and a soundness determination unit that searches for the soundness of the second building corresponding to the second damage information and the second structure information similar to the first damage information and the first structure information of which the inputs are received by the damage information input unit and the structure information input unit, and determining the soundness of the first building on the basis of the soundness of the second building that has been searched for.

According to the present invention, the soundness of the second building similar to the structure information of the first building that is an inspection target and the damage of the surface of the building are searched for, and the soundness of the first building is determined from the soundness of the second building that has been searched for. Thus, it is possible to determine the soundness of the first building that is an inspection target using the soundness of the second building similar to the first building in terms of the structure and the damage, and to rapidly and efficiently determine the soundness in consideration of the structure information of the building without decision of personnel with expertise.

The soundness determination device according to a second aspect of the present invention further comprises: a use situation information input unit that receives an input of first use situation information on a use situation of the first building, wherein the storage unit stores, for one or more of the second buildings, soundness information in which the second damage information, the second structure information, second use situation information on a use situation of the second building, and the soundness of the second building are associated with one another, and the soundness determination unit searches for the soundness of the second building corresponding to the second damage information, the second structure information, and the second use situation information similar to the first damage information, the first structure information, and the first use situation information of which the inputs are received by the damage information input unit, the structure information input unit, and the use situation information input unit, and determines the soundness of the first building on the basis of the soundness of the second building that has been searched for.

The soundness determination device according to a third aspect of the present invention further comprises: a damaged part extraction unit that extracts a damaged part from image data in which the first building is a subject.

The soundness determination device according to a fourth aspect of the present invention further comprises: a damage degree extracting unit that extracts a degree of damage at the damaged part of the first building extracted by the damaged part extraction unit, wherein the first damage information of which the input is received by the damage information input unit includes a damaged part of the first building extracted by the damaged part extraction unit and a degree of damage in the damaged part of the first building extracted by the damaged part extraction unit, the second damage information includes a damaged part of the second building and a degree of damage in the damaged part of the second building, and the soundness determination unit searches for the soundness of the second building corresponding to the damaged part of the second building, the degree of damage in the damaged part of the second building, the second structure information, and the second use situation information similar to the damaged part of the first building, the degree of damage in the damaged part of the first building, the first structure information, and the first use situation information, and determines the soundness of the first building on the basis of the soundness of the second building that has been searched for.

In the soundness determination device according to a fifth aspect of the present invention, the first structure information includes design information of the first building, and the second structure information includes design information of the second building.

In the soundness determination device according to a sixth aspect of the present invention, wherein the first use situation information includes at least one of a use environment history or a past repair history of the first building, and the second use situation information includes at least one of a use environment history or a past repair history of the second building.

In the soundness determination device according to a seventh aspect of the present invention, the soundness determination unit calculates a distance in a feature space between a feature vector of the first damage information, the first structure information, and the first use situation information and a feature vector of the second damage information, the second structure information, and the second use situation information, and searches for the soundness of the second building of which the distance is equal to or smaller than a threshold value.

The soundness determination device according to an eighth aspect of the present invention further comprises: a storage control unit that stores the soundness of the first building determined by the soundness determination unit in the storage unit in association with the first damage information, the first structure information, and the first use situation information.

The soundness determination device according to a ninth aspect of the present invention further comprises a soundness output unit that outputs the soundness of the first building determined by the soundness determination unit.

The soundness determination device according to a tenth aspect of the present invention further comprises a soundness confirmation input unit that receives a confirmation input regarding suitability of the soundness of the first building output by the soundness output unit, wherein the storage control unit stores the soundness of the first building determined by the soundness determination unit in the storage unit in association with the first damage information, the first structure information, and the first use situation information or corrects the soundness of the first building determined by the soundness determination unit and stores the corrected soundness of the first building in the storage unit in association with the first damage information, the first structure information, and the first use situation information according to the confirmation input regarding suitability of the soundness received by the soundness confirmation input unit.

In the soundness determination device according to an eleventh aspect of the present invention, the soundness output unit outputs a part or all of the soundness information on the soundness of the second building that has been searched for together with the soundness of the first building.

A twelfth aspect of the present invention provides a soundness determination method, which is executed by a computer, the method comprising: a damage information input step of receiving an input of first damage information on damage of a surface of an arbitrary first building that is a soundness determination target; a structure information input step of receiving an input of first structure information on a structure of the first building; a storage step of storing, for one or more second buildings different from the first building, second damage information on the damage of a surface of the second building, second structure information on a structure of the second building, and soundness of the second building in association with one another; and a soundness determination step of searching for the soundness of the second building corresponding to the second damage information and the second structure information similar to the first damage information and the first structure information of which the inputs are received in the damage information input step and the structure information input step, and determining the soundness of the first building on the basis of the soundness of the second building that has been searched for. A non-transitory computer readable recording medium storing a soundness determination program for causing a computer to execute the soundness determination method is also included in the aspect of the present invention.

According to the present invention, the soundness of the second building similar to the structure information of the first building that is an inspection target and the damage of the surface of the building are searched for, and the soundness of the first building is determined from the soundness of the second building that has been searched for. Thus, it is possible to determine the soundness of the first building that is an inspection target using the soundness of the second building similar to the first building in terms of the structure and the damage, and to rapidly and efficiently determine the soundness in consideration of the structure information of the building without decision of personnel with expertise.

BRIEF DESCRIPTION OF THE DRAWINGS

FIG. 2 is a diagram illustrating an example of use environment history information that accumulated in a use environment history information DB.

DESCRIPTION OF THE PREFERRED EMBODIMENTS

Figure 1:
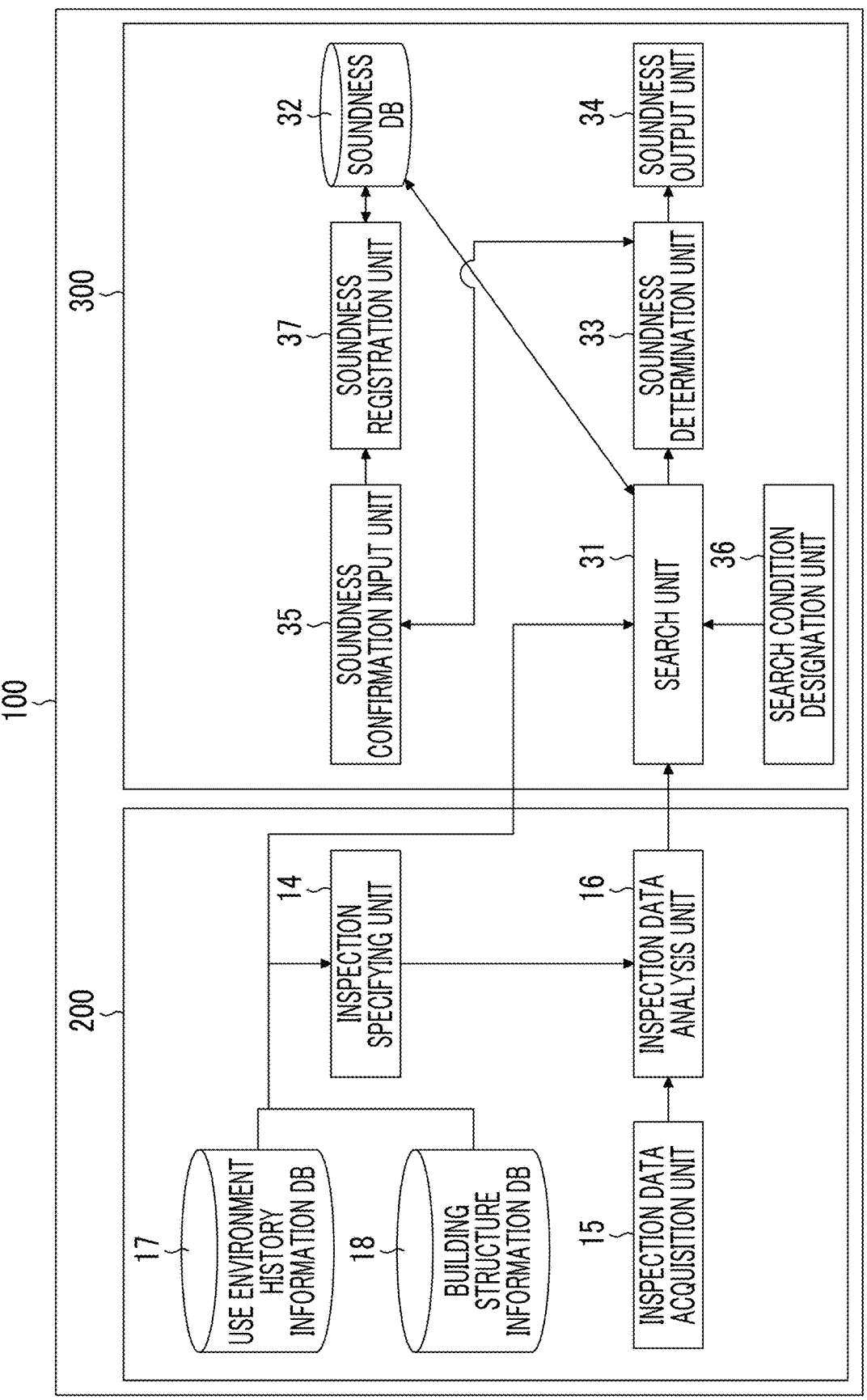
FIG. 1 is a block diagram illustrating a schematic configuration of a soundness determination system.

FIG. 1 is a block diagram illustrating a schematic configuration of a soundness determination system 100 to which the present invention is applied. The soundness determination system 100 includes a damage information extraction device 200 and a soundness determination device 300. The damage information extraction device 200 includes an inspection specifying unit 14, an inspection data acquisition unit 15, an inspection data analysis unit 16, a use environment history information database (DB) 17, and a building structure information database (DB) 18. Further, the soundness determination device 300 includes a search unit 31, a soundness database (DB) 32, a soundness determination unit 33, a soundness output unit 34, a soundness confirmation input unit 35, a search condition designation unit 36, and a soundness registration unit 37.

Each unit of the damage information extraction device 200 and each unit of the soundness determination device 300 can be configured as a known information processing device, such as a personal computer, a smartphone, a mobile phone, or a tablet terminal, including a processor, a random access memory (RAM), a read only memory (ROM), a flash memory, a display, a speaker, a touch panel, a communication interface, and the like. Further, the damage information extraction device 200 and the soundness determination device 300 may be configured as separate information processing devices, or may be configured as an integrated information processing device. In a case where the damage information extraction device 200 and the soundness determination device 300 are configured as separate information processing devices, a known communication interface connecting both is provided in each of the damage information extraction device 200 and the soundness determination device 300 such that both can perform communication. In a case where the damage information extraction device 200 and the soundness determination device 300 are integrally configured, the soundness determination system 100 is the same as the damage information extraction device 200 or the soundness determination device 300.

As illustrated in FIG. 2, the use environment history information accumulated in the use environment history information DB 17 includes use situation information indicating a use environment and a use history of the building. For example, in a case where the building is a bridge, the use environment history information includes a name, date of completion of the bridge, date of start of service of the bridge, presence or absence of an accident affecting a structure of the building such as typhoon, earthquake, flood, concentrated torrential rain, fire, or collision of an object, date of the accident, a repair history including a maintenance and repair place and date of maintenance and repair performance, an average temperature and humidity after the start of service, a cumulative amount of traffic, and a position of an abnormal place found in the past.

Although not illustrated, the use environment history information DB 17 may accumulate the use environment history information of a plurality of different buildings, or may accumulate the use environment history information of one building that is an inspection target.

Figure 3:
FIG. 3 is a diagram illustrating an example of building structure information accumulated in a building structure information DB.

As illustrated in FIG. 3, the data accumulated in the building structure information DB 18 includes a design book or a completion drawing of a building that is an inspection target, a name, a structure format of the building, image data in which an appearance of a structure of an arbitrary building that is an inspection target is recorded, a structure and a material of each part of the building, a structural positional relationship between respective parts of the building, and the like. Although not illustrated, the building structure information DB 18 may accumulate building structure information of a plurality of different buildings or may accumulate building structure information of one building that is an inspection target.

For example, in a case where the building is a bridge, a format of a basic structure of the building is a girder bridge, a truss bridge, an arch bridge, a suspension bridge, Rahmen bridge, or the like.

For materials of respective parts of the girder bridge, a main girder and a cross girder of an upper structure of the girder bridge are made of steel, a slab is made of prestressed concrete (PC), a support is made of rubber, and a lower structure is a reinforced concrete (RC) pile foundation or direct foundation.

Figure 4:
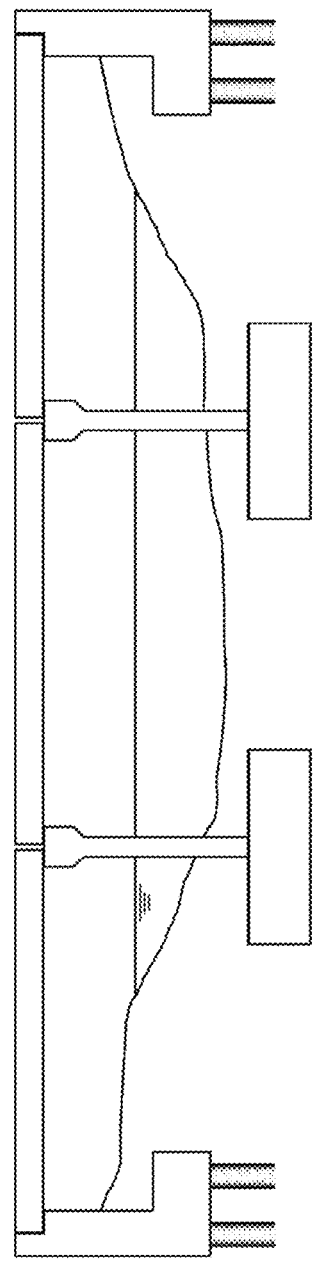
FIG. 4 is a diagram illustrating an example of a structure model of a building.

In a case where design information such as a design book or a completion drawing of a building that is an inspection target cannot be acquired, the inspection specifying unit 14 can compare an entire external appearance photograph (see FIG. 3) of the building that is an inspection target with a structure model (see FIG. 4) of a typical structure registered in the building structure information DB 18, and determine the structure information of the building that is an inspection target. This can be done by human work, or can be automated or semi-automated by input work to a computer or a process using the computer. In a case where a design book or a completion drawing of a building that is an inspection target can be acquired, these can be accumulated in the building structure information DB 18 as building structure information as they are. However, since the design book or the completion drawing may be different from actual construction results or a current state may be different from the design book or the completion drawing due to repair or replacement of members, these may be included in the building structure information, if possible.

The inspection specifying unit 14 specifies a member position that is a member position that is an inspection target among constituent members of the building, and a type of damage that is an inspection target at the member position on the basis of the building structure information and the use environment history information. This is for narrowing down the inspection targets at an important member position in the structure. Therefore, the member position that is the inspection target preferably is a pinpoint-like fixed point, but it may be a range having a spatial extent. As an example, a method of specifying the member position and the type of damage that are inspection targets are as follows.

(1) It is assumed that a format of a basic structure of the building that is the inspection target being a girder bridge, a main girder and a cross girder of an upper structure of the girder bridge being made of steel, a slab being made of concrete, and a support being made of rubber are defined in the building structure information accumulated in the building structure information DB 18.

In the use environment history information accumulated in the use environment history information DB 17, it is assumed that a place of use is defined as being within 1 km (coastal portion) from a coast.

In this case, the inspection specifying unit 14 determines a steel member in a central portion between spars of a main girder of an upper structure of the girder bridge to be the member position that is an inspection target, and also determines corrosion, rupture, crack, deflection, and dropout of bolt or nut of the steel member in the central portion between the spars of the main girder to be a type of damage to be extracted from the member position that is the inspection target. This is because, in a case where the place of use is a coastal portion, occurrence of damage related to salt damage is predicted, but the central portion between the spars of the main girder that is particularly over-weighted in a structural mechanics is intensively inspected instead of inspecting the entire steel members.

(2) In a case where the place of use is a mountainous portion, a snow melting agent is sprayed on a road surface. Therefore, occurrence of salt damage at a slab is expected. Accordingly, in this case, the inspection specifying unit 14 determines a lower surface of the slab to be the member position that is an inspection target, and determines cracks of the lower surface of the slab, and peeling and floating of the concrete as the type of damage that is the inspection target.

(3) It is assumed that flood is defined to be present in the use environment history information accumulated in the use environment history information DB 17. In this case, the inspection specifying unit 14 determines a pier foundation portion to be the member position that is an inspection target on the basis of the fact that there is flood, and also determines scouring, sinking, moving, and inclination of the pier foundation portion to be the type of damage.

(4) It is assumed that presence of an earthquake with a seismic intensity of 5 or more is defined in the use environment history information accumulated in the use environment history information DB 17. In this case, the inspection specifying unit 14 determines a pier foundation portion as the member position that is the inspection target, and determines sinking, moving, and sloping of the pier foundation portion as the types of damage that are the inspection target. Even in a case where there is no earthquake of seismic intensity of 5 or more in the use environment history information, the inspection specifying unit 14 similarly determines sinking, moving, and sloping of the pier foundation portion as the types of damage that are the inspection target in a case where a soft ground of the pier foundation portion is defined.

(5) It is assumed that presence of a reinforcing portion in a cross girder is defined in the use environment history information accumulated in the use environment history information DB 17. In this case, the inspection specifying unit 14 determines the reinforcing portion of the cross girder to be the member position that is the inspection target, and also determines rupture of a reinforcing member of the cross girder and cracks of the cross girder near the reinforcing member as the types of damage that are the inspection target.

(6) In a case where the use environment history information is not accumulated in the use environment history information DB 17, the position of a member important in terms of structural mechanics, such as a central portion of the girder, a cross girder and vertical girder joint portion is determined to be the member position that is an inspection target, and a typical deformation occurring in the member position such as cracks, ruptures, rusts, or bolt dropouts is determined as the type of damage that is an inspection target. That is, the use environment history information may not be indispensable for specifying the member position and the type of damage that are inspection targets. The term "inspection" used herein does not necessarily include only skills and decision of personnel with expertise for buildings, but includes simple work such as capturing images at the site.

Figure 5A:
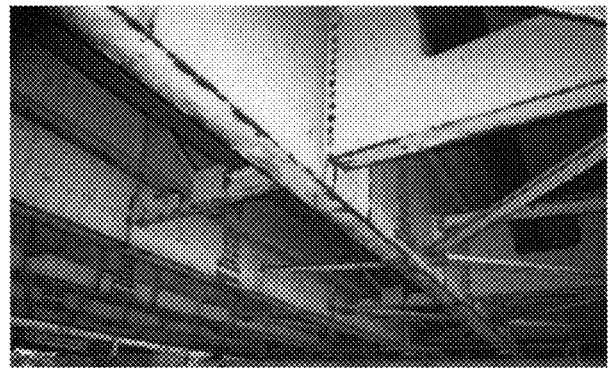
FIGS. 5A to 5C are diagrams illustrating an example of inspection data.
Figure 5B:
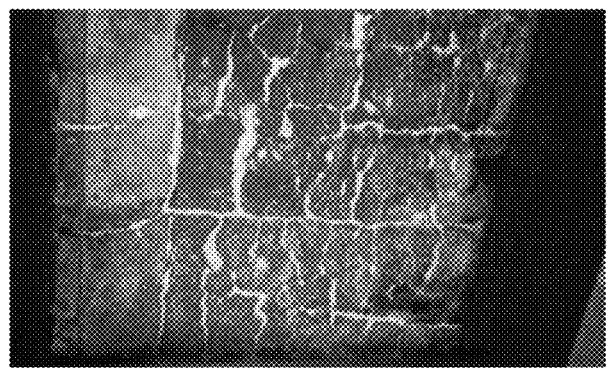
Figure 5C:
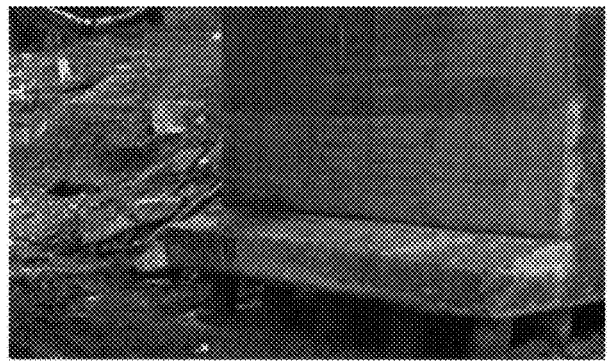

As illustrated in FIGS. 5A to 5C, the inspection data acquired by the inspection data acquisition unit 15 includes image data in which each member of an arbitrary building that is an inspection target is a subject, and position information of each member of which the image is recorded. FIG. 5A illustrates image data in which a longitudinal girder and a cross girder are subjects, FIG. 5B illustrates image data in which a lower surface of a slab is a subject, and FIG. 5C illustrates image data in which a pier foundation portion is a subject. The position information of these members may be based on position information obtained by a global positioning system (GPS). For example, image data associated with the position information of members is recorded by a person carrying a camera with a GPS or a drone or a robot having a camera with a GPS mounted thereon.

In a case where a subject image of each member of a building is recorded by a camera, all the members may be evenly included in the image data, and a photographer or an imaging device need not to selectively image important members and non-important members. That is, at the time of imaging, it is unnecessary to select an imaging position, but instead, it is necessary to recognize and image the subject without omitting each member of the building.

Since information on a position of each member present in the building rather than position information on the earth of the member is required in a damage information extraction process to be described below, it is necessary for the position information on the earth to be converted into relative position information on the building at a local coordinate set in the building that is an inspection target. For example, this conversion is performed by converting the position information on the earth into coordinates appropriately set on the building (for example, XYZ coordinates with a start point of the bridge as an origin). This can be realized by simple linear conversion. Hereinafter, it is assumed that the position information of the member included in the inspection data is the position information of the member in the building.

The inspection data acquisition unit 15 may acquire the inspection data from a movable device such as a drone or a robot on which the above-described camera with a GPS has been mounted, or may be a device in which the inspection data acquisition unit 15 itself generates the inspection data.

The inspection data analysis unit 16 acquires the image data corresponding to the member position specified as the inspection target by the inspection specifying unit 14 from the inspection data acquisition unit 15, analyzes the image data, and determines whether or not there is damage of the type of damage specified as the inspection target and a degree of damage in a case where there is the damage, from the image data. Hereinafter, information indicating the presence or absence of the damage and the degree of damage is referred to as damage information. A damaged part extraction unit and a damage degree extraction unit correspond to the above function of the inspection data analysis unit 16.

This is, for example, information on damage on a surface of the building, and a width, a length, and an area of a range of cracking, peeling, or rebar exposure of the slab, the number per unit area of the rebar exposure, a length of deflection of the main girder, an area of corrosion of a steel member of the main girder, a length of a crack, the number of dropouts of a bolt or a nut, and a length of scouring, sinking, moving, and sloping of a pier are determined by analyzing an image in which a member at the inspection position is a subject. In a case where a scale is imaged together with the image, it is easy to determine the degree of damage regarding the length, the width, and the range. Further, using various types of image analysis, it is possible to identify a difference in color between the damage and a surrounding sound place thereof and determine a damage range accompanied by a change in color such as corrosion, lime precipitation, and rebar exposure. In a case where image analysis cannot be performed, damage information may be determined through manual input of the user.

Soundness information in which structure information of one or a plurality of buildings other than the building that is an inspection target, a position of damage, a degree of damage, the use environment history information, and soundness are associated with one another are stored in the soundness DB 32. It is preferable for the soundness stored in the soundness DB 32 to be determined by personnel with expertise. It is not essential to accumulate the use environment history information in the soundness DB 32. However, it is preferable to accumulate the use environment history information in the soundness DB 32 in order to determine the soundness from the damage caused by the use environment. A storage unit corresponds to the above function of the soundness DB 32. Further, a process of storing the above information in the soundness DB 32 corresponds to a storing step.

The search unit 31 receives the type of damage and the damage degree for each member position analyzed by the inspection data analysis unit 16, the building structure information in the building structure information DB 18, and the use environment history information in the use environment history information DB 17, and searches the soundness DB 32 for other similar buildings using the building structure information, the type of damage and the degree of damage for each member position, and the use environment history information as basic search conditions. The basic search conditions can also be designated and changed arbitrarily by the search condition designation unit 36.

That is, the search unit 31 searches the soundness DB 32 for soundness of other buildings having structure information, a type of damage, a position of damage, a degree of damage, and use environment history information that are similar to the structure information of the building that is an inspection target received from the building structure information DB 18, the type of damage, the position of damage, and the degree of damage received from the inspection data analysis unit 16, and the use environment history information received from the use environment history information DB 17.

A distance between the building that is an inspection target and the other building in a feature space having the structure information of the building, the type of damage, the position of damage, the degree of damage, and the use environment history information as feature vectors is calculated, and the similarity can be determined according to whether this distance is equal to or smaller than a certain threshold value. This threshold value can be optimized by a statistical scheme.

This distance may be an unweighted distance (Euclidean distance) or may be a weighted distance (Mahalanobis distance). Which weight is assigned to which parameter may be determined by a statistical scheme such as main component analysis as in Basic Study on Evaluation of Soundness of Bridges on the basis of Bridge Inspection Database Using Statistical Scheme, Proceedings of Civil Engineering Association A2 (Applied Mechanics), Vol. 67, No. 2 (Applied Mechanics Papers Vol. 14), I_813-I_824, 2011.

In addition to the basic search conditions including structure information of one or a plurality of other buildings that are search targets, the position of damage, and the degree of damage in the soundness DB 32, an additional search condition can also be designated from the search condition designation unit 36. The additional search condition is a parameter that can be plotted as a point or a range in the above feature space. For example, as the additional search condition, a bridge of which completion date is Jan. 1, 1990 or later, Rahmen bridge as a basic structure, and a slab as a damage position can be designated. The additional search condition designated from the search condition designation unit 36 can be combined in a logical product (AND) with the basic search condition including the structure information, the use environment history information, and the type of damage and the degree of damage for each member position, and be used for search. The soundness determination unit 33 searches for a similar building on the basis of the input basic search condition and the designated additional search condition.

The soundness determination unit 33 determines the soundness of the building that is an inspection target on the basis of the soundness of the similar other building that has been searched for. The soundness of the building is a stepwise or numerical evaluation of safety of the building. For example, the soundness of another building with a minimum value of the distance is determined to be the soundness of the building that is an inspection target. A value obtained by performing simple averaging or weighted averaging on the soundness of a plurality of buildings of which the distance is equal to or smaller than a certain threshold value can also be determined to be the soundness of the building that is an inspection target. A soundness determination unit corresponds to the above function of the soundness determination unit 33.

The soundness output unit 34 includes a display, a printer, a speaker, and the like, and converts the soundness of the entire building determined by the soundness determination unit 33 into an image, a text, sound, or the like, and outputs the image, the text, the sound, or the like. The soundness output unit 34 may output all or some of structure information, a position of the damage, a degree of damage, and use environment history information of one or a plurality of other buildings similar to the structure information, the position of the damage, the degree of damage, and the use environment history information of the building that is an inspection target together as a representative example. A soundness output unit corresponds to the above function of the soundness output unit 34.

The soundness confirmation input unit 35 requests a user to confirm whether the soundness of the entire building determined by the soundness determination unit 33 is appropriate or to be corrected and to input a result of the confirmation, and receives the confirmation input. According to the confirmation input, the soundness confirmation input unit 35 outputs the soundness of the entire building determined by the soundness determination unit 33 or the corrected soundness to the soundness output unit 34, the soundness DB 32, the printer, a recording medium, a network, and the like. A soundness confirmation input unit corresponds to the above function of the soundness confirmation input unit 35.

The soundness registration unit 37 registers the soundness of the entire building that is an inspection target after the confirmation input, the structure information of the building that is an inspection target, the position of the damage, the degree of damage, and the use environment history information (however, in a case where the use environment history information is used for the determination of the soundness) in the soundness DB 32 as new soundness information. A degree of a difference from actual soundness determined by professional personnel may be converted into statistical data and the soundness information of the soundness DB 32 including an element with this difference may be deleted or corrected to optimize the soundness information of the soundness DB 32. A storage control unit of the present invention corresponds to the above function of the soundness registration unit 37.

Figure 6:
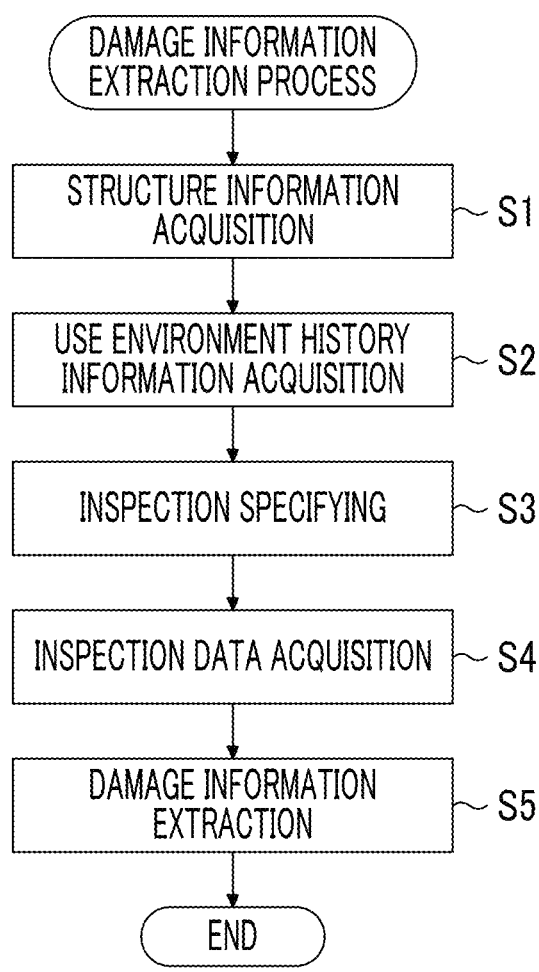
FIG. 6 is a flowchart of damage information extraction process.

FIG. 6 is a flowchart of a damage information extraction process that is executed by the damage information extraction device 200. A program for causing the damage information extraction device 200 to execute this process is stored in a computer-readable storage medium such as a flash memory of the damage information extraction device 200.

In S1 (structure information input step), the inspection specifying unit 14 acquires the building structure information of the building that is an inspection target from the building structure information accumulated in the building structure information DB 18. A structure information input unit corresponds to the above function of the inspection specifying unit 14.

In S2, the inspection specifying unit 14 acquires the use environment history information of the building that is an inspection target from the use environment history information accumulated in the use environment history information DB 17. A use situation information input unit corresponds to the above function of the inspection specifying unit 14.

In S3, the inspection specifying unit 14 specifies the member position that is an inspection target and a type of damage that is an inspection target at the member position on the basis of the building structure information acquired in S1 and the use environment history information acquired in S2. In a case where there is no use environment history information, the inspection specifying unit 14 specifies the member position that is an inspection target and the type of damage that is an inspection target at the member position on the basis of the building structure information acquired in S1.

In step S4, the inspection data acquisition unit 15 acquires inspection data including image data obtained by imaging and recording a subject image of each member of an arbitrary building that is an inspection target, and position information of each member at which the image is recorded. As described above, respective members are evenly included as subjects in the image data.

In S5, the inspection data analysis unit 16 acquires the image data corresponding to the member position specified as the inspection target by the inspection specifying unit 14 from the inspection data acquisition unit 15, analyzes the image data, and determines, from the image data, whether there is damage of the damage type specified as the inspection target, and the degree of damage in a case where there is the damage. Since the inspection data analysis unit 16 does not analyze the image data corresponding to the member position that is not specified as the inspection target, analysis of damage of an unimportant member is omitted. However, a member position not specified by the inspection specifying unit 14 is also designated individually as the member position that is the inspection target according to an instruction from the user, and then, can be analyzed by the inspection data analysis unit 16.

Through the above process, it is possible to extract damage information from image data corresponding to an important member position among image data in which each unspecified member of the building is a subject. Therefore, it is possible to efficiently obtain damage information of the important member position without spending time at an installation site of the building.

Figure 7:
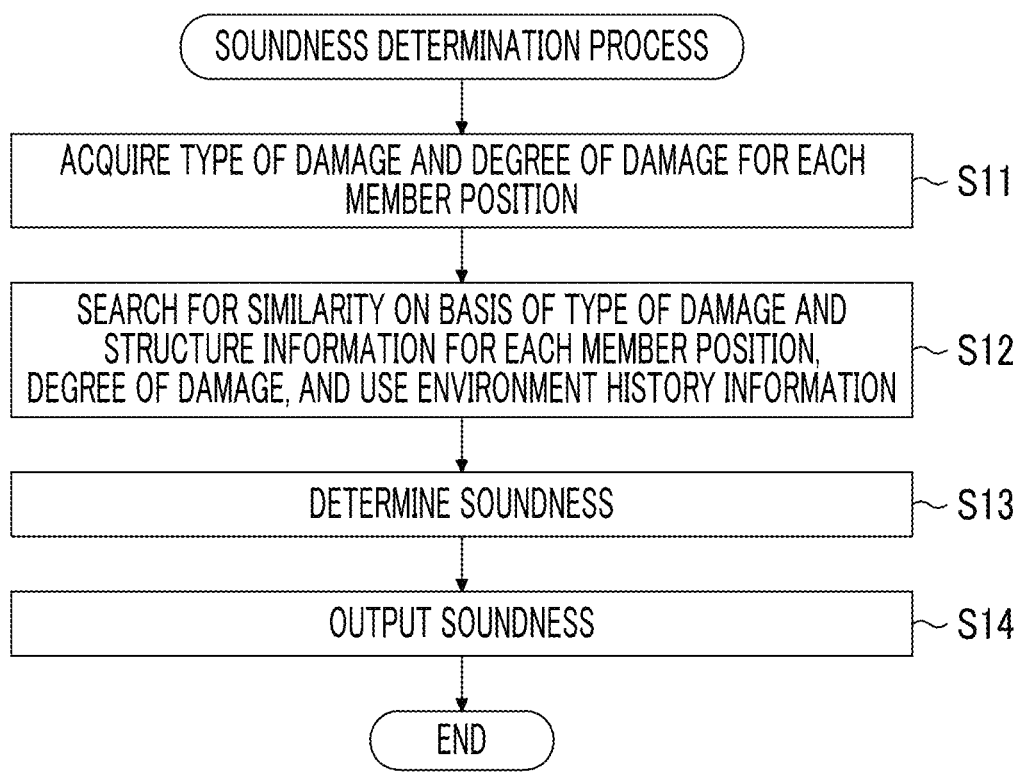
FIG. 7 is a flowchart of a soundness determination process.

FIG. 7 is a flowchart of the soundness determination process that is executed by the soundness determination device 300. A program for causing the soundness determination device 300 to execute this process is stored in a computer-readable storage medium such as a flash memory of the soundness determination device 300.

In S11 (damage information input step), the search unit 31 acquires the type of damage and the degree of damage for each member position obtained in the damage information extraction process of the damage information extraction device 200. A damage information input unit corresponds to the above function of the search unit 31.

In S12, the search unit 31 collates the building structure information of the building structure information DB 18, the degree of damage corresponding to the type of damage for each member position analyzed by the inspection data analysis unit 16, and the use environment history information of the use environment history information DB 17 with the soundness information of the soundness DB 32 and searches for the soundness of the building similar thereto. However, in a case where the use environment history information is not accumulated in the use environment history information DB 17, the search unit 31 collates the building structure information of the building structure information DB 18 and the degree of damage corresponding to the type of damage for each member position analyzed by the inspection data analysis unit 16 with the soundness information of the soundness DB 32 and searches for the soundness of the building similar thereto.

In S13 (soundness determination step), the soundness determination unit 33 determines the soundness of the building that is an inspection target on the basis of the soundness of the building that has been searched for. A soundness determination unit corresponds to the above function of the soundness determination unit 33.

In S14, the soundness output unit 34 outputs the soundness determined in S12 to a display, a printer, or the like. A soundness output unit corresponds to the above function of the soundness output unit 34.

With the above process, damage information can be extracted from the image data corresponding to an important member position among image data in which each unspecified member of the building that is an inspection target is a subject, and the soundness of the building that is an inspection target can be determined from soundness of another building having information similar to the damage information of the building that is an inspection target and the structure information of the building that is an inspection target.

A range in which the present invention is applied is not limited to bridges, and the present invention can be generally applied to all buildings, including civil engineering structures such as tunnels, sheds, culverts, slope protections, retaining walls, dams, and revetments, and buildings such as apartments. That is, it is possible to determine an appropriate member position and an appropriate type of damage that are the inspection targets according to the type of building and a use environment thereof, and to determine the soundness of the building from image data or the like for each member position.

For example, it is assumed that the inspection target is a tunnel constructed using a pile construction scheme, and an installation place of the tunnel is a mountainous region of a cold place in the use environment history information. In this case, for lining, a longitudinal striking joint, a transverse striking joint, a transverse direction joint, a longitudinal direction joint, a vicinity of a top edge, a vicinity at a middle of a lining span are determined to be member positions that are inspection targets, and types of damage of the inspection target are cracks continuous to the joints and the top edge, cracks near the middle of the liner span, fragmentation of cracks due to such cracks, lifting, peeling, discoloration, leakage, and steps. This is intended to intensively inspect places at which cracks or the like easily occur due to thermal expansion and contraction. Further, in a case where a repaired place, a cold joint, and an occurrence place of a honeycomb are shown in the use environment history information, positions thereof are determined to be the member positions that are the inspection targets, and a deformation such as cracks at the positions is determined to be the type of damage that is the inspection target. This is because these are parts that are easily deformed due to a structural weakness.

The soundness of the building that is an inspection target is determined from soundness of the other buildings having a similar degree of damage for each member position.

Alternatively, in a case where the inspection target is an RC building, image data in which a member constituting a frame such as a pillar, a beam, a wall, and a slab is a subject is recorded in association with a presence position of the member, the presence or absence of a type of damage corresponding to each member, such as a type of damage such as cracks, paint peeling, rebar exposure, painted surface chalking, and leakage, and a degree of the damage are detected from the image data, a similar building is searched for on the basis of the degree of the damage, and the soundness of the building that is the inspection target is determined.

EXPLANATION OF REFERENCES

14: inspection specifying unit
15: inspection data acquisition unit
16: inspection data analysis unit
17: use environment history information database
18: building structure information database
31: search unit
32: soundness database
33: soundness determination unit
34: soundness output unit
35: soundness confirmation input unit
36: search condition designation unit
37: soundness registration unit

What is claimed is:

1. A soundness determination device comprising:
a damage information input unit that receives an input of first damage information on damage of a surface of an arbitrary first building that is a soundness determination target;
a structure information input unit that receives an input of first structure information on a structure of the first building;
a storage unit that stores, for one or more second buildings different from the first building, soundness information in which second damage information on the damage of a surface of the second building, second structure information on a structure of the second building, and soundness of the second building are associated with one another;
a soundness determination unit that searches for the soundness of the second building corresponding to the second damage information and the second structure information similar to the first damage information and the first structure information of which the inputs are received by the damage information input unit and the structure information input unit, and determines the soundness of the first building on the basis of the soundness of the second building that has been searched for; and
a use situation information input unit that receives an input of first use situation information on a use situation of the first building,
wherein the storage unit stores, for one or more of the second buildings, soundness information in which the second damage information, the second structure information, second use situation information on a use situation of the second building, and the soundness of the second building are associated with one another, the soundness determination unit searches for the soundness of the second building corresponding to the second damage information, the second structure information, and the second use situation information similar to the first damage information, the first structure information, and the first use situation information of which the inputs are received by the damage information input unit, the structure information input unit, and the use situation information input unit, and determines the soundness of the first building on the basis of the soundness of the second building that has been searched for, the soundness determination device further comprises:
  a damaged part extraction unit that extracts a damaged part from image data in which the first building is a subject, and
  a damage degree extracting unit that extracts a degree of damage at the damaged part of the first building extracted by the damaged part extraction unit, the first damage information of which the input is received by the damage information input unit includes a damaged part of the first building extracted by the damaged part extraction unit and a degree of damage in the damaged part of the first building extracted by the damaged part extraction unit, and the second damage information includes a damaged part of the second building and a degree of damage in the damaged part of the second building.

2. The soundness determination device according to claim 1,
  wherein the first structure information includes design information of the first building, and
  the second structure information includes design information of the second building.

3. The soundness determination device according to claim 2, further comprising:
  a storage control unit that stores the soundness of the first building determined by the soundness determination unit in the storage unit in association with the first damage information, the first structure information, and the first use situation information.

4. The soundness determination device according to claim 1,
  wherein the first use situation information includes at least one of a use environment history or a past repair history of the first building, and
  the second use situation information includes at least one of a use environment history or a past repair history of the second building.

5. The soundness determination device according to claim 1,
  wherein the soundness determination unit calculates a distance in a feature space between a feature vector of the first damage information, the first structure information, and the first use situation information and a feature vector of the second damage information, the second structure information, and the second use situation information, and searches for the soundness of the second building of which the distance is equal to or smaller than a threshold value.

6. The soundness determination device according to claim 2,
  wherein the soundness determination unit calculates a distance in a feature space between a feature vector of the first damage information, the first structure information, and the first use situation information and a feature vector of the second damage information, the second structure information, and the second use situation information, and searches for the soundness of the second building of which the distance is equal to or smaller than a threshold value.

7. The soundness determination device according to claim 1, further comprising:
  a storage control unit that stores the soundness of the first building determined by the soundness determination unit in the storage unit in association with the first damage information, the first structure information, and the first use situation information.

8. The soundness determination device according to claim 7, further comprising:
  a soundness output unit that outputs the soundness of the first building determined by the soundness determination unit.

9. The soundness determination device according to claim 8, further comprising:
  a soundness confirmation input unit that receives a confirmation input regarding suitability of the soundness of the first building output by the soundness output unit,
  wherein the storage control unit stores the soundness of the first building determined by the soundness determination unit in the storage unit in association with the first damage information, the first structure information, and the first use situation information or corrects the soundness of the first building determined by the soundness determination unit and stores the corrected soundness of the first building in the storage unit in association with the first damage information, the first structure information, and the first use situation information according to the confirmation input regarding suitability of the soundness received by the soundness confirmation input unit.

10. The soundness determination device according to claim 8,
  wherein the soundness output unit outputs a part or all of the soundness information on the soundness of the second building that has been searched for together with the soundness of the first building.

11. A soundness determination method which is executed by a computer, the method comprising:
  a damage information input step of receiving an input of first damage information on damage of a surface of an arbitrary first building that is a soundness determination target;
  a structure information input step of receiving an input of first structure information on a structure of the first building;
  a storage step of storing, for one or more second buildings different from the first building, second damage information on the damage of a surface of the second building, second structure information on a structure of the second building, and soundness of the second building in association with one another;
  a soundness determination step of searching for the soundness of the second building corresponding to the second damage information and the second structure information similar to the first damage information and the first structure information of which the inputs are received in the damage information input step and the structure information input step, and determining the soundness of the first building on the basis of the soundness of the second building that has been searched for; and a use situation information input step of receiving an input of first use situation information on a use situation of the first building, wherein the storage step includes a step of storing, for one or more of the second buildings, soundness information in which the second damage information, the second structure information, second use situation information on a use situation of the second building, and the soundness of the second building are associated with one another, the soundness determination step includes a step of searching for the soundness of the second building corresponding to the second damage information, the second structure information, and the second use situation information similar to the first damage information, the first structure information, and the first use situation information of which the inputs are received in the damage information input step, the structure information input step, and the use situation information input step, and a step of determining the soundness of the first building on the basis of the soundness of the second building that has been searched for, the soundness determination method further comprises:

a damaged part extraction step of extracting a damaged part from image data in which the first building is a subject, and a damage degree extracting step of extracting a degree of damage at the damaged part of the first building extracted in the damaged part extraction step, the first damage information of which the input is received in the damage information input step includes a damaged part of the first building extracted in the damaged part extraction step and a degree of damage in the damaged part of the first building extracted in the damaged part extraction step, and the second damage information includes a damaged part of the second building and a degree of damage in the damaged part of the second building.

12. A non-transitory computer readable recording medium storing a soundness determination program for causing a computer to execute the soundness determination method according to claim 11.

13. A soundness determination device comprising:

a damage information input unit that receives an input of first damage information on damage of a surface of an arbitrary first building that is a soundness determination target;

a structure information input unit that receives an input of first structure information on a structure of the first building;

a storage unit that stores, for one or more second buildings different from the first building, soundness information in which second damage information on the damage of a surface of the second building, second structure information on a structure of the second building, and soundness of the second building are associated with one another;

a soundness determination unit that searches for the soundness of the second building corresponding to the second damage information and the second structure information similar to the first damage information and the first structure information of which the inputs are received by the damage information input unit and the structure information input unit, and determines the soundness of the first building on the basis of the soundness of the second building that has been searched for; and a use situation information input unit that receives an input of first use situation information on a use situation of the first building, wherein the storage unit stores, for one or more of the second buildings, soundness information in which the second damage information, the second structure information, second use situation information on a use situation of the second building, and the soundness of the second building are associated with one another, the soundness determination unit searches for the soundness of the second building corresponding to the second damage information, the second structure information, and the second use situation information similar to the first damage information, the first structure information, and the first use situation information of which the inputs are received by the damage information input unit, the structure information input unit, and the use situation information input unit, and determines the soundness of the first building on the basis of the soundness of the second building that has been searched for, the first use situation information includes at least one of a use environment history or a past repair history of the first building, and the second use situation information includes at least one of a use environment history or a past repair history of the second building.

\* \* \* \* \*